(12) United States Patent
Mochizuki et al.

(10) Patent No.: US 7,542,652 B2
(45) Date of Patent: Jun. 2, 2009

(54) MULTI-BEAM LIGHT SOURCE, METHOD FOR MANUFACTURING THE SAME, LIGHT SCANNING UNIT USING THE SAME, AND IMAGE FORMING APPARATUS USING THE SAME

(75) Inventors: Takeshi Mochizuki, Hitachinaka (JP); Kenichi Kugai, Hitachinaka (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 57 days.

(21) Appl. No.: 11/649,813

(22) Filed: Jan. 5, 2007

(65) Prior Publication Data

US 2007/0160329 A1    Jul. 12, 2007

(30) Foreign Application Priority Data

Jan. 6, 2006    (JP) .............................. 2006-001492

(51) Int. Cl.
*G02B 6/00* (2006.01)
*G02B 6/04* (2006.01)
*G02B 26/08* (2006.01)

(52) U.S. Cl. .................... 385/137; 385/120; 359/204
(58) Field of Classification Search .................. 385/137
See application file for complete search history.

(56) References Cited

U.S. PATENT DOCUMENTS 6,873,770 B2* 3/2005 Leung et al. .................. 385/52

2003/0194198 A1* 10/2003 Francis ........................ 385/137
2004/0114859 A1* 6/2004 Colgan et al. ................. 385/31

FOREIGN PATENT DOCUMENTS

| JP | 56-069611 A | 6/1981 |
| JP | 2000-147296 A | 5/2000 |
| JP | 2001-66438 A | 3/2001 |
| JP | 2001-83361 A | 3/2001 |
| JP | 2004-122400 A | 4/2004 |
| JP | 2004-258566 A | 9/2004 |

* cited by examiner

*Primary Examiner*—Uyen Chau N Le
*Assistant Examiner*—Kajli Prince
(74) *Attorney, Agent, or Firm*—Crowell & Moring LLP (57) ABSTRACT

The invention is to provide a multi-beam light source where the interval of core portions is reduced and the core portions are arranged on a straight line. The multi-beam light source includes a first substrate where a plurality of optical fibers each having a core portion and a clad portion surrounding the core portion coaxially are fixed at predetermined intervals, and a second substrate where a plurality of similar optical fibers are fixed at predetermined intervals. The first and second substrates are put and bonded on top of each other so that the core portion of each optical fiber on the second substrate is inserted between core portions of adjacent optical fibers on the first substrate, and the core portions of the optical fibers on the first and second substrate are arranged substantially on a straight line.

16 Claims, 7 Drawing Sheets

MULTI-BEAM LIGHT SOURCE, METHOD FOR MANUFACTURING THE SAME, LIGHT SCANNING UNIT USING THE SAME, AND IMAGE FORMING APPARATUS USING THE SAME

FIELD OF THE INVENTION

The present invention relates to a multi-beam light source suitable to a light scanning unit or the like using multiple beams, and a method for manufacturing the multi-beam light source.

DESCRIPTION OF THE BACKGROUND ART

Techniques using an array of a plurality of optical fibers as a light source for a light scanning unit have been disclosed (see JP-A-2004-258566 and JP-A-2001-66438). The alignment accuracy of core portions is an essential problem in light scanning with high accuracy.

Figure 13:
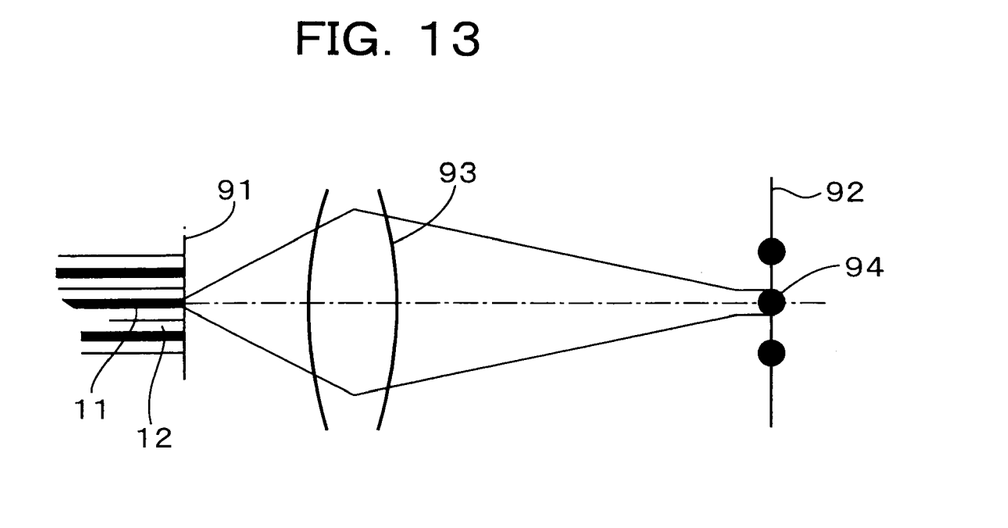
FIG. 13 is a view showing the relationship between an aperture diameter and a beam spot diameter.
Figure 14:
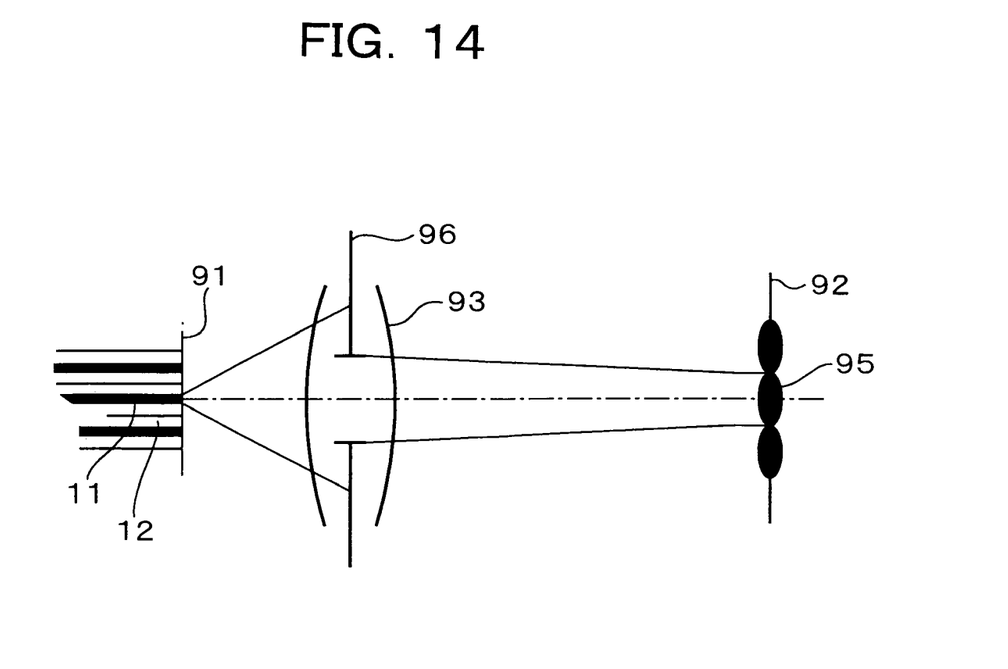
FIG. 14 is a view showing the relationship between an aperture diameter and a beam spot diameter.

When an array of a plurality of optical fibers is used as a light source for a light scanning unit, it is generally a problem that the diameter of a core portion of each optical fiber is significantly smaller than the diameter of a clad portion thereof. FIGS. 13 and 14 show the relationship between an aperture diameter and a beam spot diameter.

In FIGS. 13 and 14, the reference numeral 11 represents a core portion; 12, a clad portion; 91, a light source portion; 92, a to-be-scanned surface; 93, a lens system; 94 and 95, beam spots; and 96, an aperture member. The light source portion 91 and the to-be-scanned surface 92 are generally disposed in an optically conjugate relationship by the lens 93 for the reason which will be described later.

Assume that the clad portions 12 are disposed contiguously in the light source portion 91. In this case, the ratio of the diameter of each clad portion 12 and the diameter of each core portion 11 is equal to the ratio of the scanning line interval to the diameter of each beam spot 94, 95 in the to-be-scanned surface 92. When the diameter of the core portion 11 is significantly smaller than the diameter of the clad portion 12, the diameter of the beam spot 94 becomes significantly smaller than the scanning line interval. Thus, as shown in FIG. 13, contiguous scanning lines cannot be formed.

A solution to this is to use a method in which the diameter of a beam emitted from each core portion 11 is narrowed by the aperture member 96 so as to increase the diameter of the core portion 11 equivalently as shown in FIG. 14. However, the beam is partially blocked by the aperture member 96. There is a problem that the luminous energy of the beam is lost.

As a solution to this problem, there has been proposed a method in which a predetermined thickness of an outside circumferential portion of each clad portion is removed by etching or the like so as to reduce the outer diameter of the clad portion (see JP-A-2000-147296). Thus, it is possible to reduce the intervals of the core portions of the optical fibers.

However, there is a problem that etching easily leads to a variation in thickness of removal. There is also a problem that the workability is low when the clad portions whose diameters have been narrowed by etching are fixed to groove portions of a substrate individually by a method such as bonding.

In order to miniaturize light guide parts, there is another proposal where optical fibers are fixed to two substrates respectively, and the substrates are put on top of each other so as to arrange the optical fibers in two stages (see JP-A-2001-83361 or JP-A-2004-122400). According to this method, the light guide parts can be miniaturized as compared with the case where optical fibers are arranged on a single substrate.

However, in the case where the light guide parts are used as light sources for a light scanning unit, there is a problem that the light sources arrayed in two stages lead to separation when beams emitted from the light sources are incident on a light deflecting unit such as a polygon mirror. As a solution to this problem, there is a method where the misalignment is corrected by use of a lens or the like (see JP-A-56-69611). However, due to a complicated configuration, there arises a problem that the optical path length is increased, or the like.

When the light source portion and the to-be-scanned surface are not disposed in an optically conjugate relationship, the ratio of the beam spot diameter to the scanning line interval in the to-be-scanned surface becomes larger than the ratio of the diameter of the core portion to the diameter of the clad portion in the light source portion. Therefore, there are conditions where contiguous scanning lines can be formed. However, this means the state where beams are not focused on the to-be-scanned surface. The beam diameters become unstable spatially. Thus, this method is not practical.

SUMMARY OF THE INVENTION

A principal object of the present invention is to provide a multi-beam light source in which core portions are not arrayed in two stages but the intervals of the core portions can be reduced, a method for manufacturing the multi-beam light source, a light scanning unit using the multi-beam light source, and an image forming apparatus using the multi-beam light source.

According to a first configuration of the present invention, there is provided a multi-beam light source including: a first substrate where a plurality of optical fibers each having a core portion and a clad portion surrounding the core portion coaxially are fixed at predetermined intervals; and a second substrate where a plurality of similar optical fibers are fixed at predetermined intervals; wherein the first substrate and the second substrate are put and bonded on top of each other in such a manner that a core portion of each optical fiber on the second substrate is inserted between core portions of adjacent optical fibers on the first substrate, and the core portions of the optical fibers on the first and second substrates are disposed substantially on a straight line.

According to a second configuration of the present invention, in the multi-beam light source according to the first configuration, a distance between core portions adjacent to each other is smaller than a maximum value of an outer diameter of each clad portion.

According to a third configuration of the present invention, there is provided a multi-beam light source including: a first substrate where an optical fiber having a core portion and a clad portion surrounding the core portion coaxially is fixed; and a second substrate where a similar optical fiber is fixed; wherein the first substrate and the second substrate are bonded on top of each other in such a manner that the core portion of the optical fiber on the first substrate and a core portion of the optical fiber on the second substrate are arranged closely to each other so that a distance between the core portions is smaller than a maximum value of an outer diameter of each clad portion.

According to a fourth configuration of the invention, in the multi-beam light source according to the first or third configuration, V-shaped grooves are formed on the substrates, and the optical fibers are fixedly inserted into the V-shaped grooves respectively one by one.

According to a fifth configuration of the invention, in the multi-beam light source according to the first or third configuration, a gap is formed in a portion where the optical fibers on the first and second substrates face each other in the state where the core portions of the optical fibers on the first and second substrates are arranged closely to each other, and a bonding material is charged into the gap so as to bond the first and second substrates integrally.

According to a sixth configuration of the invention, in the multi-beam light source according to the first or third configuration, a gap is formed in peripheral portions of the first and second substrates in the state where the core portions of the optical fibers on the first and second substrates are arranged closely to each other, and a bonding material is charged into the gap so as to bond the first and second substrates integrally.

According to a seventh configuration of the invention, in the multi-beam light source according to the first or third configuration, the clad portion of each optical fiber fixed to the first substrate and opposed to the second substrate is partially cut, and the clad portion of each optical fiber fixed to the second substrate and opposed to the first substrate is partially cut, while thickness in a thinnest portion of a surviving layer of each clad portion is four or more times as large as wavelength of the light source.

According to an eighth configuration of the invention, there is provided a method for manufacturing a multi-beam light source, including:

an insertion step of inserting optical fibers into a plurality of V-shaped grooves respectively one by one, each optical fiber having a core portion and a clad portion surrounding the core portion coaxially, the clad portion being exposed, the V-shaped grooves being formed at predetermined intervals on each of first and second substrates;

a fixation step of charging a bonding material into a gap between each substrate and each optical fiber so as to fix the optical fiber onto the substrate;

a cutting step of cutting the clad portion of each optical fiber and a surface-side layer of the bonding material from a side opposite to each substrate, so that the core portion and the clad portion in the periphery of the core portion in the optical fiber project on the side opposite to the substrate while the core portion of the optical fiber and a predetermined thickness of the clad portion in a part of the periphery of the core portion are left as they are; and a bonding step of bonding the first and second substrates obtained in the cutting step integrally by the bonding material in such a manner that a core portion of each optical fiber on the second substrate is inserted between core portions of adjacent optical fibers on the first substrate and the core portions of the optical fibers on the first and second substrates are disposed substantially on a straight line.

According to a ninth configuration of the invention, the method according to the eighth configuration further includes an adjustment step between the insertion step and the fixation step, wherein in the adjustment step the optical fibers inserted into the V-shaped grooves are rotated circumferentially so that the positions of the core portions of the optical fibers are adjusted.

According to a tenth configuration of the invention, in the method according to the eighth configuration, the cutting step includes:

a flat cutting step of uniformly cutting the surface-side clad portion of each optical fiber and the surface-side layer of the bonding material from the side opposite to each substrate; and a pitch feed cutting step of partially cutting the clad portion located between the core portion of the optical fiber and a core portion adjacent thereto, so that the core portion and the clad portion surviving in the periphery thereof project on the side opposite to the substrate.

According to an eleventh configuration of the invention, there is provided a light scanning unit including: a multi-beam light source; a coupling optics for forming beams emitted from the multi-beam light source into substantially parallel beams; an optical deflecting element for deflecting the beams from the coupling optics so as to scan a to-be-scanned surface with the deflected beams; and a focusing optics for focusing the beams from the coupling optics on the to-be-scanned surface; wherein the multi-beam light source is a multi-beam light source according to any one of claims 1 through 7.

According to a twelfth configuration of the invention, in the light scanning unit according to the eleventh configuration, the multi-beam light source and the to-be-scanned surface are disposed substantially in an optically conjugate relationship.

According to a thirteenth configuration of the invention, there is provided an image forming apparatus including: a photoconductor; a charging unit for charging the photoconductor; a light scanning unit for optically scanning the photoconductor charged by the charging unit so as to form an electrostatic latent image on the photoconductor; a developing unit for developing the electrostatic latent image into a toner image with toner; a transfer unit for transferring the toner image formed by the developing unit onto a recording medium; and a fixation unit for fixing the toner image transferred onto the recording medium; wherein the light scanning unit is a light scanning unit according to the eleventh configuration.

Due to the invention configured thus, the core portions can be disposed at smaller intervals relatively to the clad diameter and with higher accuracy. Thus, the loss of luminous energy can be suppressed to be as low as possible.

DETAILED DESCRIPTION OF THE INVENTION

Figure 2:
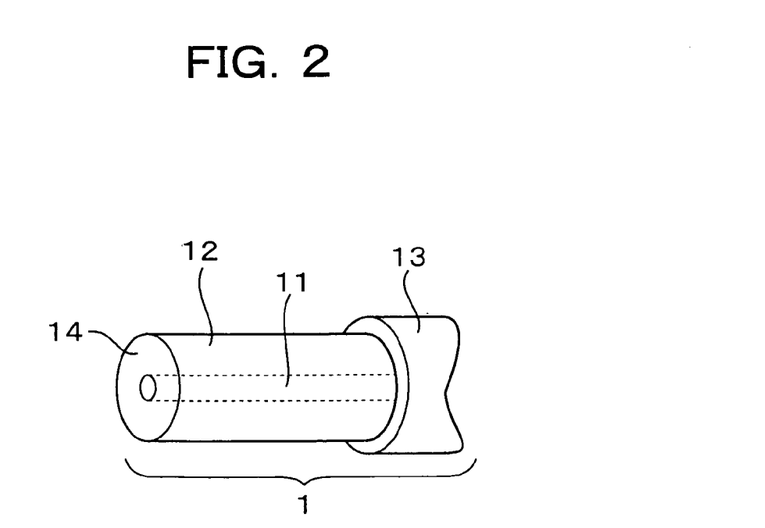
FIG. 2 is a perspective view of an optical fiber to be used in the embodiment of the invention.

FIG. 2 is a perspective view showing a fundamental structure of an optical fiber which can be used in this embodiment. In FIG. 2, the reference numeral 1 represents an optical fiber; 11, a core portion; 12, a clad portion; 13, a coating portion; and 14, an end surface of the optical fiber 1. The optical fiber 1 is constituted by the core portion 11 having a comparatively high refractive index, the clad portion 12 surrounding the core portion 11 coaxially, and the coating portion 13 in the periphery of the clad portion 12. The optical fiber 1 also has the end surface 14 perpendicular to the direction in which the core portion 11 and the clad portion 12 extend. Light (laser beam) incident on the other not-shown end surface is emitted from the core portion 11 in the end surface 14. The coating portion 13 is removed in the vicinity of the end surface 14 so that the clad portion 12 is exposed. The exposed clad portion 12 is, for example, about 3-6 mm long. The exposed clad portion 12 is fixedly bonded to a substrate 2 as will be described later.

Figure 1:
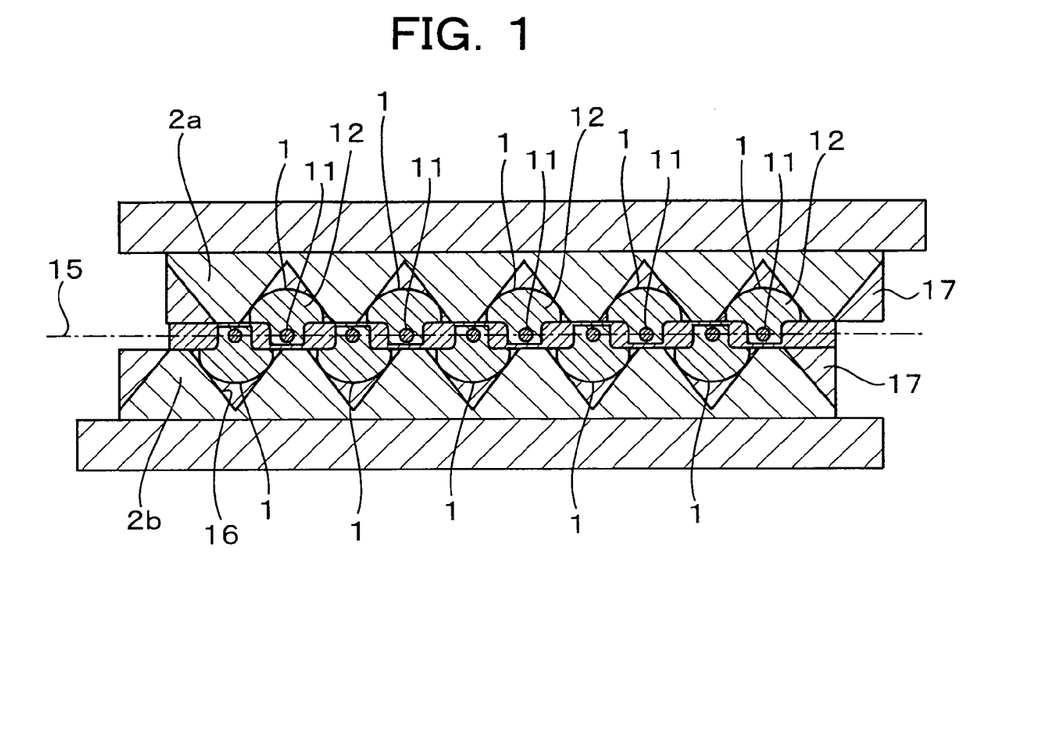
FIG. 1 is a sectional view of a multi-beam light source according to an embodiment of the present invention.

FIG. 1 is a sectional view of a multi-beam light source according to this embodiment. In FIG. 1, the reference numeral 1 represents optical fibers; 2, substrates which are, for example, made of silicon wafer, ceramic, glass or the like; 11, core portions; 12, clad portions; and 16, a plurality (5 in this embodiment) of V-shaped grooves formed at an equal interval and in parallel on the substrates 2. In FIG. 1, the state where 10 optical fibers 1 have been arranged is observed from the end surface 14 side. The 10 core portions 11 are disposed on a substantially straight line 15. In this embodiment, it is preferable that the core of each core portion 11 is 3.6 µm to 4.0 µm (3.8±0.2 µm), the core of each clad portion 12 is 123.5 µm to 126.5 µm (125±1.5 µm), the distance between adjacent core portions 11 is 149.22 µm to 150.78 µm (150±0.78 µm), and the depth of each V-shaped groove 16 is 98 µm to 100 µm (99±1 µm).

Figure 3:
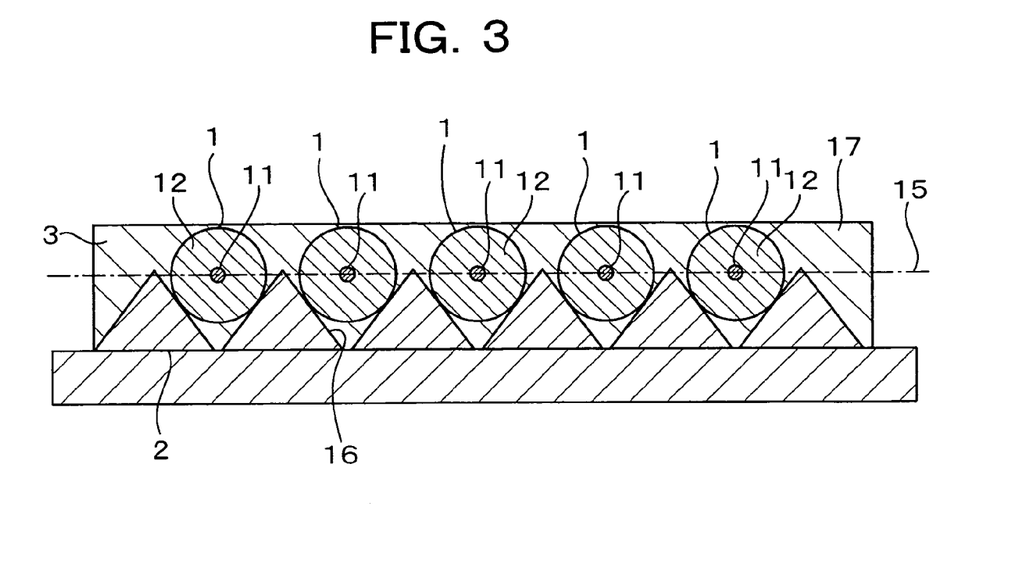
FIG. 3 is an explanatory view of a method for manufacturing the multi-beam light source according to the embodiment of the invention.

A method for manufacturing the multi-beam light source will be described with reference to FIGS. 3 to 8. In FIG. 3, the state where the optical fibers 1 have been disposed is observed from the end surface 14 side. In FIG. 3, the reference numeral 2 represents a substrate; and 3, a bonding material which is, for example, made of UV-curing resin, epoxy resin, or the like. The substrate 2 has a plurality of V-shaped grooves 16 formed at an equal interval. The V-shaped grooves 16 are formed precisely by anisotropic etching of Si wafer or dicing of a material such as Si wafer, ceramic or glass by use of a diamond blade saw. The V-shaped grooves 16 penetrate the substrate 2 from this side to the deeper side.

As shown in FIG. 2, the tip portions of the optical fibers 1 whose clad portions 12 are exposed are made to fall into the V-shaped grooves 16 respectively one by one. Herein accordance with necessity, rotational adjustment is performed with the peripheral surfaces of the clad portions 12 being kept in contact with the V-shaped grooves 16 so as to dispose the core portions 11 on a single straight line 15, that is, to true up the vertical positions of the core portions 11.

After that, a curing bonding material 3 which is, for example, made of UV-curing resin or the like is injected and charged between each optical fiber 1 and the substrate 2, and subjected to curing treatment by ultraviolet irradiation. Thus, the tip portions of the optical fibers 1 are fixedly bonded into the V-shaped grooves 16 of the substrate 2 respectively so that the tip portions of the optical fibers 1 are buried in a bonding material layer 17.

Figure 4:
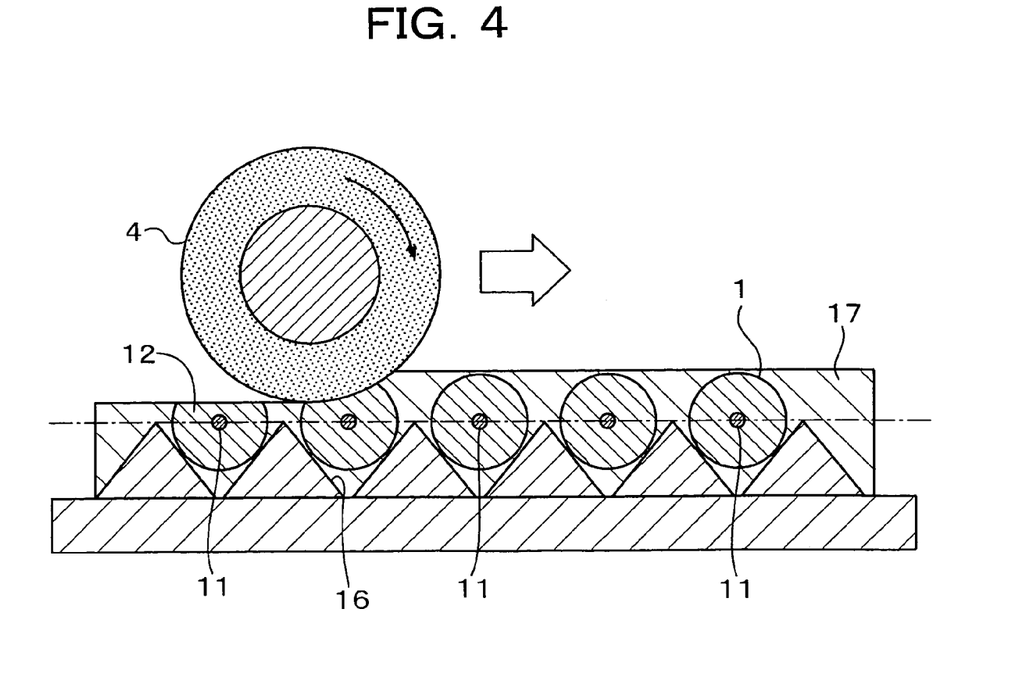
FIG. 4 is an explanatory view of a method for manufacturing the multi-beam light source according to the embodiment of the invention.

Next as shown in FIG. 4, the clad portions 12 and the bonding material layer 17 are ground uniformly from the opposite side (surface side) with respect to the substrate 2 by a grindstone 4 so as to be flat. They are ground till the clad portions 12 partially survive in the peripheral portions (upper portions) of the core portions 11.

Figure 5:
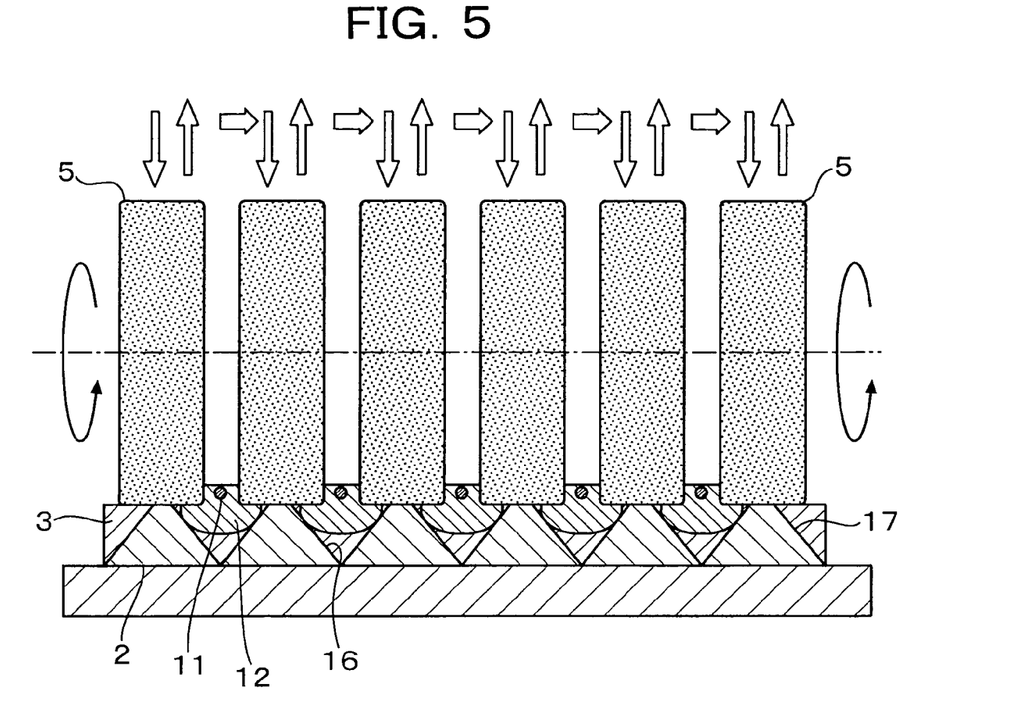
FIG. 5 is an explanatory view of a method for manufacturing the multi-beam light source according to the embodiment of the invention.

Next as shown in FIG. 5, the clad portions 12 among the core portions 11, the bonding material layer 17 and a part of the substrate 2 are ground by a diamond grindstone 5 such as a dicer while pitch-feeding the diamond grindstone 5. Thus, the grooves are cut in the pitch direction. This grinding is performed like a straight line over a predetermined length in parallel to the axial directions of the optical fibers 1. The width of the grindstone 5 on this occasion is made slightly wider than ½ of the interval of the core portions 11. Thus, a predetermined thickness of the clad portions 12 can survive in the peripheral portions (left and right side surfaces) of the core portions 11.

Figure 6:
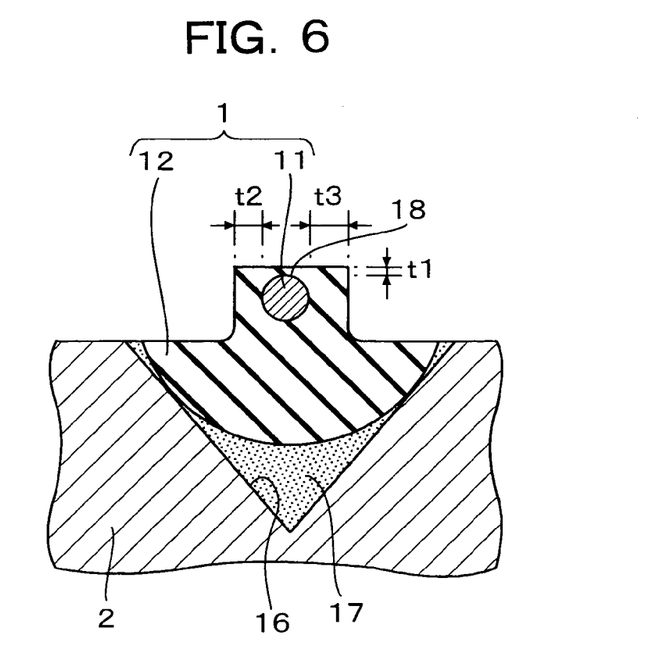
FIG. 6 is an explanatory view of a method for manufacturing the multi-beam light source according to the embodiment of the invention.

When thickness t ($t_1$, $t_2$, $t_3$) of the thinnest portion of a surviving layer 18 of the clad portion 12 is four or more times as large as the wavelength of the light source as shown in FIG. 6, transmission loss can be suppressed within a practically enough low range. In this embodiment, the thinnest portion of the surviving layer 18 of the clad portion 12 is located in the upper portion of the core portion 11. The thickness $t_1$ is set to be 32 µm to 34 µm. With some way of grinding, thickness $t_2$ or thickness $t_3$ of the surviving layer 18 of the clad portion 12 may correspond to the thickness t of the thinnest portion.

In this manner, each core portion 11 is left as it is, and each clad portion 12 is left partially in the periphery of the core portion 11. Thus, an optical fiber array with a substrate where the core portions 11 and the surviving layers 18 of the clad portions 12 project on the opposite side to the substrate 2 is manufactured.

Figure 7:
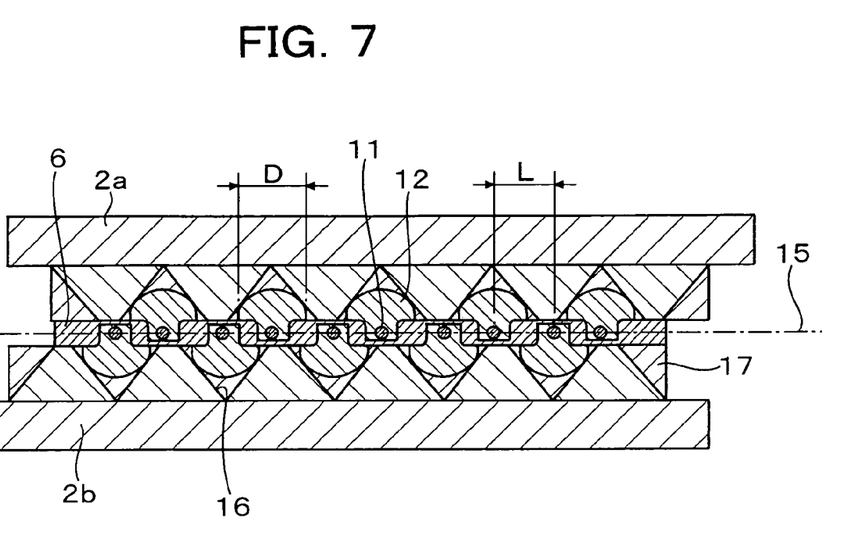
FIG. 7 is an explanatory view of a method for manufacturing the multi-beam light source according to the embodiment of the invention.

Two optical fiber arrays manufactured thus are paired. That is, as shown in FIG. 7, a first substrate 2a and a second substrate 2b are put on top of each other so that the core portion 11 of each optical fiber 1 on the second substrate 2b is inserted (to an intermediate position) between core portions 11 of the adjacent optical fibers 1 on the first substrate 2a. The positions of the first and second substrates 2a and 2b are adjusted so that the core portions 11 are disposed substantially on the single straight line 15.

This adjustment will be described specifically. The first substrate 2a and the second substrate 2b are retained by their jigs (not shown) respectively. Light is passed through the core portion 11 of each optical fiber 1, and the end surface 14 (see FIG. 2) of the optical fiber 1 is observed through a microscope. An adjusting screw between the jigs is turned to adjust the relative positional relationship between the first substrate 2a and the second substrate 2b so that the core portions 11 are arranged substantially on the single straight line 15.

When the positions of the first substrate 2a and the second substrate 2b have been adjusted, the bonding material 6 such as UV-curing resin is injected and charged into a gap formed in the portion where the first substrate 2a and the second substrate 2b face each other. The bonding material 6 is subjected to curing treatment so as to bond the first and second substrates 2a and 2b.

Figure 8:
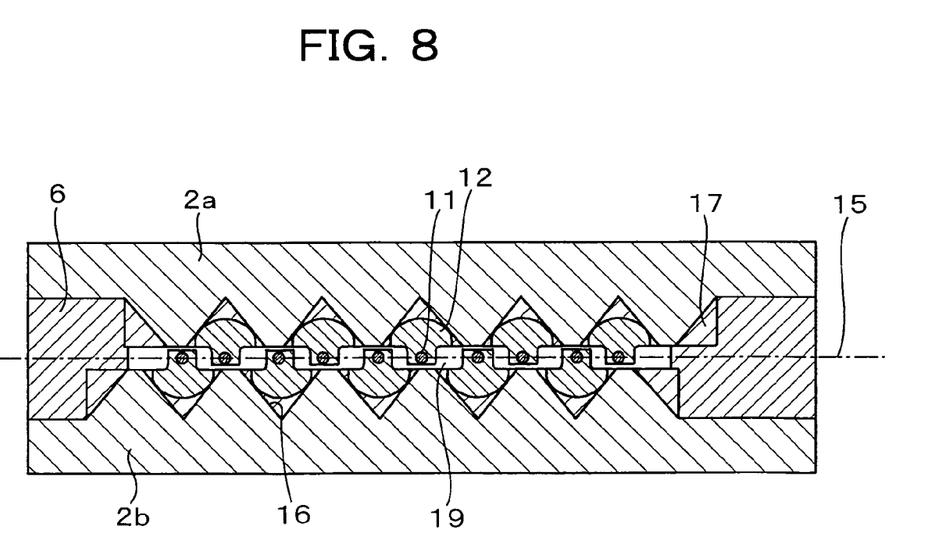
FIG. 8 is an explanatory view of a method for manufacturing the multi-beam light source according to the embodiment of the invention.

FIG. 8 is a sectional view showing a modification of substrate bonding. In this modification, the bonding material 6 is not charged into a gap 19 formed in the portion where the first substrate 2a and the second substrate 2b face each other, but a gap is formed in the periphery of the portion where the first substrate 2a and the second substrate 2b face each other, and the bonding material 6 is charged into the gap. Thus, the first substrate 2a and the second substrate 2b are bonded directly.

As shown in FIG. 7, the optical fiber array is designed so that an interval L of the core portions 11 is smaller than a maximum value D of the outer diameter of each clad portion 12. As a result, the core portions 11 can be disposed closely to each other. In this embodiment, the maximum value D of the outer diameter of each clad portion 12 is designed to be 123.5 μm to 126.5 μm, and the interval L of the core portions 11 is designed to be 74.5 μm to 75.5 μm.

Figure 9:
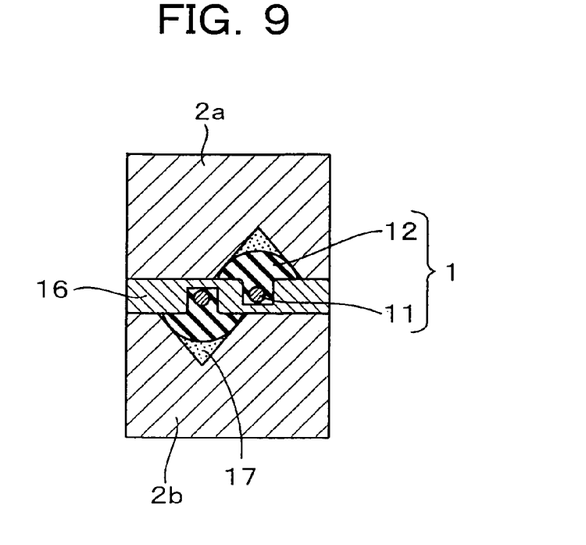
FIG. 9 is a sectional view of a multi-beam light source according to another embodiment of the invention.

FIG. 1 shows an example where 10 optical fibers are disposed on a straight line. On the other hand, FIG. 9 shows an example of a multi-beam light source having two optical fibers 1, where a first substrate 2a having one optical fiber 1 fixed thereto and a second substrate 2b having one optical fiber 1 fixed thereto are put and bonded on top of each other. Also in this case, the first substrate 2a and the second substrate 2b are bonded so that the interval L of the core portions 11 is made smaller than the maximum value D of the outer diameter of each clad portion 12, and the core portion 11 of the optical fiber 1 on the first substrate 2a and the core portion 11 of the optical fiber 1 on the second substrate 2b are arranged closely to each other. A method for manufacturing this multi-beam light source is similar to the aforementioned embodiment.

Figure 10:
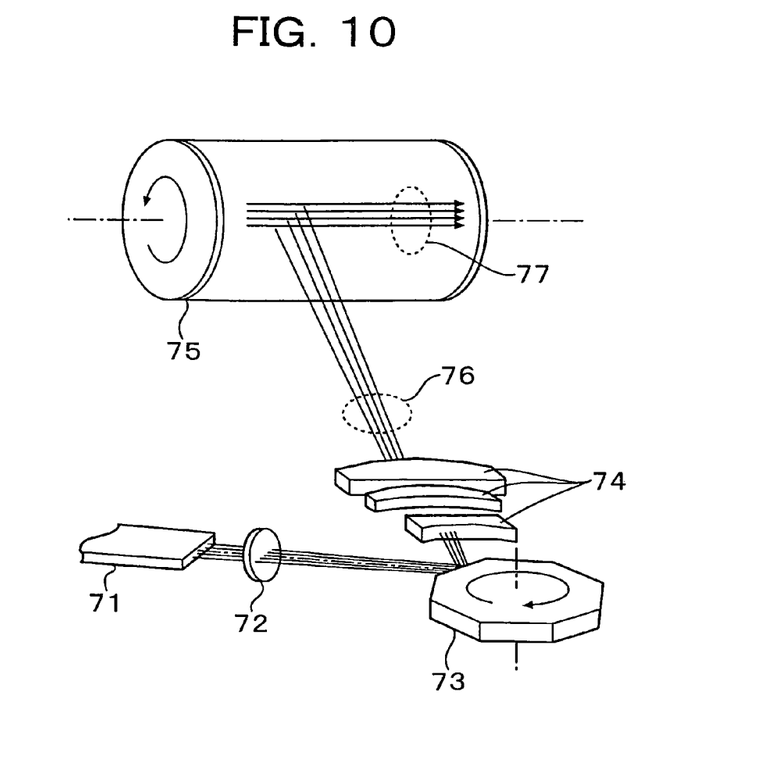
FIG. 10 is a schematic configuration view of a light scanning unit according to an embodiment of the invention.

FIG. 10 shows an embodiment of a light scanning unit using a multi-beam light source according to the present invention. In FIG. 10, the reference numeral 71 represents a multi-beam light source; 72, a coupling lens serving as a coupling optics for forming beams emitted from the multi-beam light source 71 into substantially parallel beams; 73, a rotary polygon mirror serving as an optical deflecting element for deflecting the beams from the coupling lens 72 so as to scan the to-be-scanned surface with the deflected beams; 74, Fθ lenses serving as a focusing optics for focusing the beams from the coupling lens 72 on the to-be-scanned surface; 75, a photoconductor drum serving as a to-be-scanned medium; 76, beams; and 77, trajectories of the beams on the photoconductor drum 75. The peripheral surface of the photoconductor drum 75 is coated with a photoconductive medium. This is an external cylinder type light scanning unit for use in a laser printer etc.

Figure 11:
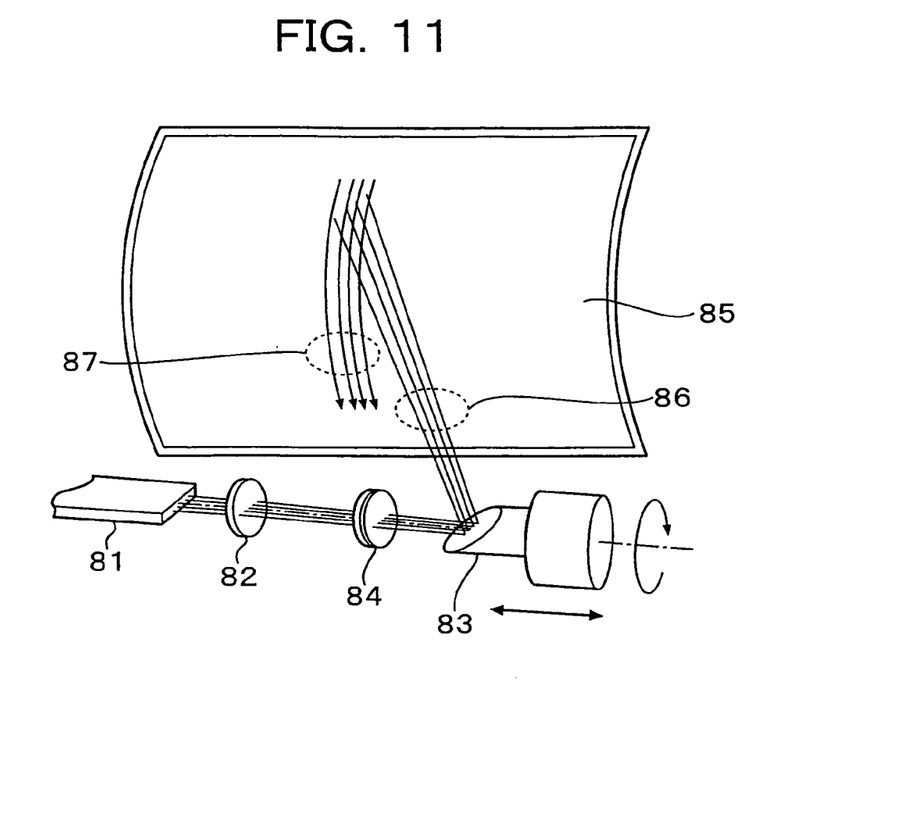
FIG. 11 is a schematic configuration view of a light scanning unit according to another embodiment of the invention.

FIG. 11 shows another embodiment of a light scanning unit using a multi-beam light source according to the invention. In FIG. 11, the reference numeral 81 represents a multi-beam light source; 82, a coupling lens serving as a coupling optics; 83, a spinner mirror serving as an optical deflecting element; 84, a focusing lens serving as a focusing optics; 85, a photoconductor drum serving as a to-be-scanned medium; 86, beams; and 87, trajectories of the beams on the drum. A photoconductive medium is retained on the inner surface of the photoconductor drum 85. This is an internal cylinder type light scanning unit for use in film plate making etc.

Figure 12:
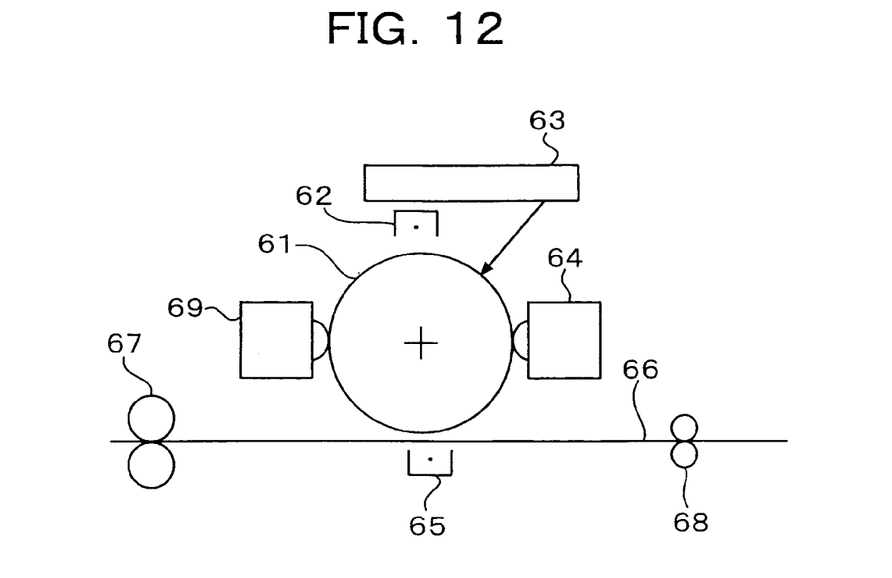
FIG. 12 is a schematic configuration view of an image forming apparatus according to an embodiment of the invention.

FIG. 12 shows an embodiment of an image forming apparatus such as a laser printer using a light scanning unit according to the invention. In FIG. 12, the reference numeral 61 represents a photoconductor drum; 62, a charging unit for charging the peripheral surface of the photoconductor drum 61 uniformly; 63, a light scanning unit for optically scanning the photoconductor drum 61 charged by the charging unit 62 so as to form an electrostatic latent image on the photoconductor drum 61; 64, a developing unit for developing the electrostatic latent image into a toner image with toner; 65, a transfer unit for transferring the toner image formed by the developing unit 64 onto a recording medium 66 such as paper; 67, a fixation unit for fixing the toner image transferred onto the recording medium 66; 68, a conveyance unit for conveying the recording medium 66; and 69 a cleaning unit for removing toner surviving on the photoconductor drum 61.

What is claimed is:

1. A multi-beam light source comprising:
a first substrate where a plurality of optical fibers each having a core portion and a clad portion surrounding the core portion coaxially are fixed at predetermined intervals; and
a second substrate where a plurality of similar optical fibers are fixed at predetermined intervals; wherein:
the first substrate and the second substrate are put and bonded on top of each other in such a manner that a core portion of each optical fiber on the second substrate is inserted between core portions of adjacent optical fibers on the first substrate, and the core portions of the optical fibers on the first and second substrates are disposed substantially on a straight line;
wherein a distance between core portions adjacent to each other is smaller than a maximum value of an outer diameter of each clad portion.

2. A light scanning unit comprising:
a multi-beam light source;
a coupling optics for forming beams emitted from the multi-beam light source into substantially parallel beams;
an optical deflecting element for deflecting the beams from the coupling optics so as to scan a to-be-scanned surface with the deflected beams; and
a focusing optics for focusing the beams from the coupling optics on the to-be-scanned surface;
wherein the multi-beam light source is a multi-beam light source according to claim 1.

3. A light scanning unit according to claim 2, wherein the multi-beam light source and the to-be-scanned surface are disposed substantially in an optically conjugate relationship.

4. An image forming apparatus comprising:
a photoconductor;
a charging unit for charging the photoconductor;
a light scanning unit for optically scanning the photoconductor charged by the charging unit so as to form an electrostatic latent image on the photoconductor;
a developing unit for developing the electrostatic latent image into a toner image with toner;
a transfer unit for transferring the toner image formed by the developing unit onto a recording medium; and
a fixation unit for fixing the toner image transferred onto the recording medium;
wherein the light scanning unit is a light scanning unit according to claim 2.

5. A multi-beam light source according to claim 1, wherein V-shaped grooves are formed on the substrates, and the optical fibers are fixedly inserted into the V-shaped grooves respectively one by one.

6. A multi-beam light source according to claim 1, wherein a gap is formed in a portion where the optical fibers on the first and second substrates face each other in the state where the core portions of the optical fibers on the first and second substrates are arranged closely to each other, and a bonding material is charged into the gap so as to bond the first and second substrates integrally.

7. A multi-beam light source according to claim 1, wherein a gap is formed in peripheral portions of the first and second substrates in the state where the core portions of the optical fibers on the first and second substrates are arranged closely to each other, and a bonding material is charged into the gap so as to bond the first and second substrates integrally.

8. A multi-beam light source according to claim 1, wherein the clad portion of each optical fiber fixed to the first substrate and opposed to the second substrate is partially cut, and the clad portion of each optical fiber fixed to the second substrate and opposed to the first substrate is partially cut, while thickness in a thinnest portion of a surviving layer of each clad portion is four or more times as large as wavelength of the light source.

9. A multi-beam light source comprising:
a first substrate where an optical fiber having a core portion and a clad portion surrounding the core portion coaxially is fixed; and
a second substrate where a similar optical fiber is fixed; wherein:
the first substrate and the second substrate are bonded on top of each other in such a manner that the core portion of the optical fiber on the first substrate and a core portion of the optical fiber on the second substrate are arranged closely to each other so that a distance between the core portions is smaller than a maximum value of an outer diameter of each clad portion.

10. A multi-beam light source according to claim 9, wherein V-shaped grooves are formed on the substrates, and the optical fibers are fixedly inserted into the V-shaped grooves respectively one by one.

11. A multi-beam light source according to claim 9, wherein a gap is formed in a portion where the optical fibers on the first and second substrates face each other in the state where the core portions of the optical fibers on the first and second substrates are arranged closely to each other, and a bonding material is charged into the gap so as to bond the first and second substrates integrally.

12. A multi-beam light source according to claim 9, wherein a gap is formed in peripheral portions of the first and second substrates in the state where the core portions of the optical fibers on the first and second substrates are arranged closely to each other, and a bonding material is charged into the gap so as to bond the first and second substrates integrally.

13. A multi-beam light source, comprising:
a first substrate where a plurality of optical fibers each having a core portion and a clad portion surrounding the core portion coaxially are fixed at predetermined intervals; and
a second substrate where a plurality of similar optical fibers are fixed at predetermined intervals; wherein:
the first substrate and the second substrate are put and bonded on top of each other in such a manner that a core portion of each optical fiber on the second substrate is inserted between core portions of adjacent optical fibers on the first substrate, and the core portions of the optical fibers on the first and second substrates are disposed substantially on a straight line;
wherein the clad portion of each optical fiber fixed to the first substrate and opposed to the second substrate is partially cut, and the clad portion of each optical fiber fixed to the second substrate and opposed to the first substrate is partially cut, while thickness in a thinnest portion of a surviving layer of each clad portion is four or more times as large as wavelength of the light source.

14. A method for manufacturing a multi-beam light source, comprising:
an insertion step of inserting optical fibers into a plurality of V-shaped grooves respectively one by one, each optical fiber having a core portion and a clad portion surrounding the core portion coaxially, the clad portion being exposed, the V-shaped grooves being formed at predetermined intervals on each of first and second substrates;
a fixation step of charging a bonding material into a gap between each substrate and each optical fiber so as to fix the optical fiber onto the substrate;
a cutting step of cutting the clad portion of each optical fiber and a surface-side layer of the bonding material from a side opposite to each substrate, so that the core portion and the clad portion in the periphery of the core portion in the optical fiber project on the side opposite to the substrate while the core portion of the optical fiber and a predetermined thickness of the clad portion in a part of the periphery of the core portion are left as they are; and
a bonding step of bonding the first and second substrates obtained in the cutting step integrally by the bonding material in such a manner that a core portion of each optical fiber on the second substrate is inserted between core portions of adjacent optical fibers on the first substrate and the core portions of the optical fibers on the first and second substrates are arranged substantially on a straight line.

15. A method for manufacturing a multi-beam light source according to claim 14, further comprising an adjustment step between the insertion step and the fixation step, wherein in the adjustment step the optical fibers inserted into the V-shaped grooves are rotated circumferentially so that the positions of the core portions of the optical fibers are adjusted.

16. A method for manufacturing a multi-beam light source according to claim 14, wherein the cutting step includes:
a flat cutting step of uniformly cutting the surface-side clad portion of each optical fiber and the surface-side layer of the bonding material from the side opposite to each substrate; and
a pitch feed cutting step of partially cutting the clad portion located between the core portion of the optical fiber and a core portion adjacent thereto, so that the core portion and the clad portion surviving in the periphery thereof project on the side opposite to the substrate.

* * * * *